United States Patent [19]

van Stiphout et al.

[11] Patent Number: 4,728,971

[45] Date of Patent: Mar. 1, 1988

[54] IMAGE-FORMING ELEMENT FOR AN ELECTROSTATIC PRINTER WITH HELICAL SHAPED ELECTRODES

[75] Inventors: Johannes G. V. van Stiphout, Beek en Donk; Reinder Pannekoek, Venlo, both of Netherlands

[73] Assignee: Oce-Nederland B.V., Venlo, Netherlands

[21] Appl. No.: 43,882

[22] Filed: Apr. 29, 1987

[30] Foreign Application Priority Data

May 29, 1986 [NL] Netherlands ........................ 8601377

[51] Int. Cl.[4] ............................................ G01D 15/00
[52] U.S. Cl. ................................ 346/155; 346/139 C
[58] Field of Search ................ 346/153.1, 155, 139 C; 400/119; 358/300

[56] References Cited

U.S. PATENT DOCUMENTS 4,397,085 8/1983 Goff, Jr. et al. .................... 346/155

*Primary Examiner*—Arthur G. Evans
*Attorney, Agent, or Firm*—Reed Smith Shaw & McClay

[57] ABSTRACT

An image-forming element for an electrostatic printer is provided with an endless support having thereon a dielectric surface layer and a number of image-forming electrodes beneath the surface of the dielectric layer. In the zone of the image-forming element that is used for image formation, the electrodes extend parallel to one another in the form of helix, having a pitch which is at least equal to the working width of the image-forming element so that each electrode appears only once in a line of the image. Each electrode is connected to a voltage means for supplying voltage to the electrodes. The voltage means is disposed on the surface of the endless support outside the zone used for image formation.

8 Claims, 3 Drawing Figures

IMAGE-FORMING ELEMENT FOR AN ELECTROSTATIC PRINTER WITH HELICAL SHAPED ELECTRODES

FIELD OF THE INVENTION

The present invention relates to an image-forming element for an electrostatic printer, consisting of an endless support with electrodes and a dielectric surface layer thereon.

BACKGROUND OF THE INVENTION

U.S. Pat. No. 3,816,840 describes an electrostatic printing process and printer in which a dielectric image-receiving material is fed between a first and a second electrode which are disposed a short distance apart. One of the electrodes is covered with a layer of magnetically attractable electrically conductive toner powder. Voltage pulses are applied between the electrodes so that tone powder is deposited on the image-receiving material in the form of an information pattern. A disadvantage of this process is that only dielectric image-receiving material can be used, thereby restricting the choice of usable image-receiving materials.

U.S. Pat. No. 3,946,402 describes an electrostatic printer comprising a rotatable drum provided with a dielectric layer on which a uniform layer of electrically conductive magnetically attractable toner powder is applied. A magnetic roller is disposed in an image-forming zone near the drum surface covered with toner powder and has a stationary nonmagnetic sleeve and a rotatable magnet system mounted inside the sleeve. A large number of magnetic electrodes in the form of rods each connected to a voltage supply are disposed axially on the sleeve of this magnetic roller. When the electrodes are not energized, toner powder is attracted from the drum surface to the magnetic roller. No toner powder is attracted when the electrodes are energized. By energizing the electrodes pulse-wise according to an information pattern, a toner image corresponding to the information pattern is formed on the drum and can then be transferred to a receiving support.

Since the electrodes are conductive they must be insulated from one another. A disadvantage of this device is that the conductive toner powder can short-circuit some electrodes and thus disturb the image formation. Another disadvantage is that it is a very complex and expensive matter to construct the row of fine magnetic electrodes in rod form used in this device.

Japanese Application No. 59-224369 shows an image-forming element comprising an endless support with an insulating layer and a multiplicity of electrodes embedded in the insulating layer. Preferably, the electrodes form rings around the circumference of the support and are selectively electrified from within the support. One embodiment, however, shows the electrodes extending in the shape of a helix. No provision, however, is made for electrifying the electrodes on the surface of the support or doing so outside the image-forming zone. Indeed, electrifying the electrodes from within the suport, as this device teaches, is not easy to do and requires the construction of a special support. A better way of electrifying the electrodes is needed.

Spiral electrodes have been used before as can be seen from Japanese Application Nos. 58-72474 and 58-171975 and German Application No. 28 37 828. The spiral electrode in Japanese Application No. 58-171975 is provided on the surface of the cylindrical support. No insulating layer covers it. Instead, the toner used must be insulating. The same appears to be true with German Application No. 28 37 828. In Japanese Application No. 58-72474, while there is an insulating layer, this layer is peeled off in a straight line to expose the conductors and form the multistylus electrode. If conductive toner is used with any of these structures, it can short-circuit some electrodes and thus disturb the image formation.

Accordingly there is a need for an image-forming element for an electrostatic printer which obviates the above-mentioned disadvantages.

SUMMARY OF THE INVENTION

Generally the present invention provides an image-forming element for an electrostatic printer consisting of an endles support with a dielectric surface layer thereon wherein a plurality of image-forming electrodes are provided beneath the dielectric surface layer and extend parallel to one another in the zone of the image-forming element used for image formation. Each electrode extends in the form or shape of a helix, the pitch of which is at least equal to the working width of the image-forming element and is connected to a voltage means for supplying voltage to each electrode. The voltage means is disposed on the endless support, outside the zone used for image formation and supplies voltage to the electrodes according to an information pattern.

The term "working width" of the image-forming element denotes the width of that part of the image-forming element when considered in a direction perpendicular to the direction of movement which is used for image formation.

In the image-forming element according to the present invention, the electrodes are completely insulated from one another so that short-circuiting of one or more electrodes by the applied electrically conductive toner is eliminated. Since the image-forming element electrodes are disposed in the image-forming element itself, a conventional magnetic roller can be used in the image forming process. This results in a simpler and cheaper construction in addition to better copy quality.

The voltage means for energizing the electrodes in accordance with an information pattern of which is to be printed, is disposed on the surface of the support outside the zone used for image formation. Preferably, it is disposed on the surface of the support, near one or both ends and on the periphery thereof. When disposed in this position, the voltage means can be secured fairly simply to the support, and, what is particularly important, it is readily accessible for maintenance or for the replacement of any faulty components.

The image-forming electrodes extend in accordance with a helix. The following relationship applies to the angle of inclination of the helix along which the image-forming electrodes extend, the working width W of the image-forming element, and the diameter d of the image forming element:

$$\tan \alpha = \frac{F \times W}{\pi \times d} \quad (1)$$

wherein F is the ratio between the helix pitch and the working width W of the image-forming element. The values of F, W and d are selected so that the angle of inclination $\alpha$ is between 35° and 55° and is preferably about 45°. An angle of about 45° is preferred from the view point of forming image characters and fonts.

In practical situations the working width W is determined by the requirement made with respect to the largest (widest) image format that is to be reproduced by the image forming element, while the diameter d of the image forming element is frequently determined by constructional considerations. Thus, to achivee a preferred angle of inclination of, for example, 45°, the value F has to be calcuated in accordance with the formula in equation (1). In the case of an image-forming element having a working width of 330 mm and a diameter of 110 mm, the value of F must be 1.05 to achieve an angle of inclination of about 45°.

Other advantages of the present invention will become apparent from the following detailed description and accompanying drawings of a presently preferred embodiment of the best mode of carrying out the invention.

DESCRIPTION OF THE PREFERRED EMBODIMENT

Figure 1:
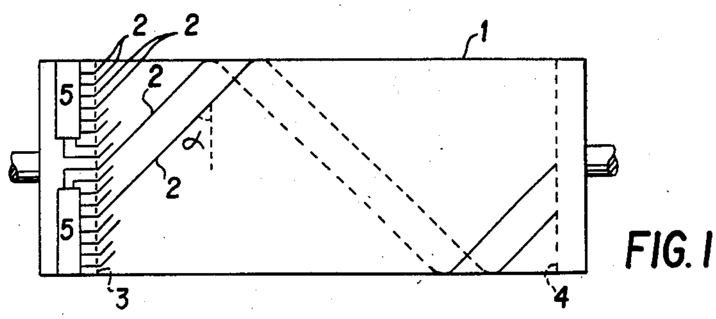
FIG. 1 is a diagrammatic view of an image-forming element according to the present invention.

The image-forming element as shown in FIG. 1 comprises a drum 1 having an insulating surface on which are disposed a plurality of electrodes 2 which extend in a parallel relationship. In that part of the drum surface which is situated between dotted lines 3 and 4, i.e. in part of drum 1 which is used for image-formation, each electrode 2 extends along a helix whose pitch is equal to the working width W of the image-forming zone. The working width W of drum 1 is equal to the distance between dotted lines 3 and 4. In FIG. 1, for the sake of clarity, only a few electrodes 2 are shown completely. The angle of inclination $\alpha$ of the helix followed by electrodes 2 in FIG. 1 is about 45°.

Electrodes 2 are covered with a dielectric layer which is not shown in FIG. 1 for the sake of clarity. Each electrode 2 is connected to one of several blocks 5 disposed on one side of the drum surface, outside the image-forming zone. Blocks 5 represent the voltage means for applying voltage to electrodes 2 selectively in accordance with an information pattern. Blocks 5 each comprise a plurality of integrated circuits known, for example, from video display techniques. Typically these integrated circuits comprise a serial-in parallel-out shift register, an output register and drivers having a voltage range of 15 to 25 volts. Each electrode 2 is connected to the driver of one of the integrated circuits in blocks 5. The number of blocks 5 depends on the number of electrodes 2.

The quality of the images formed on the image-forming element depends, inter alia, on the number of electrodes 2. As the electrode density increases the image quality improves. The number of electrodes when considered in a direction perpendicular to the circumferential direction of drum 1 is at least ten per millimeter, and preferably fourteen to twenty per millimeter.

The image-forming element according to the present invention can be made by applying an electrically conductive metal layer such as copper to a drum having an insulating surface, or having a conductive surface provided with an insulating layer, in a known manner such as by vapor-coating or electroplating. This metal layer can then be converted to a pattern of electrodes extending helically by the use of known photo-etch techniques or by burning-in with a laser beam. The electrodes on the drum surface or at least that part of the drum surface which forms the image-forming zone, are then provided with a dielectric layer, which preferably has a thickness of just a few tenths of a micrometer (i.e., 0.2 to 0.8 micrometers). Suitable dielectric material for forming this layer are known, inter alia, from microelectronics.

In the embodiment of the present invention shown in FIG. 1, blocks for controlling electrodes 2 are disposed along one side of the surface of drum 1 outside the image-forming zone. It will be apparent that these blocks can be distributed over both sides of drum 1. The fact that the electronic components are disposed on the outer surface of drum 1 has the advantage that they are easily accessible and can therefore readily be replaced in the event of a fault or defect.

Figure 3:
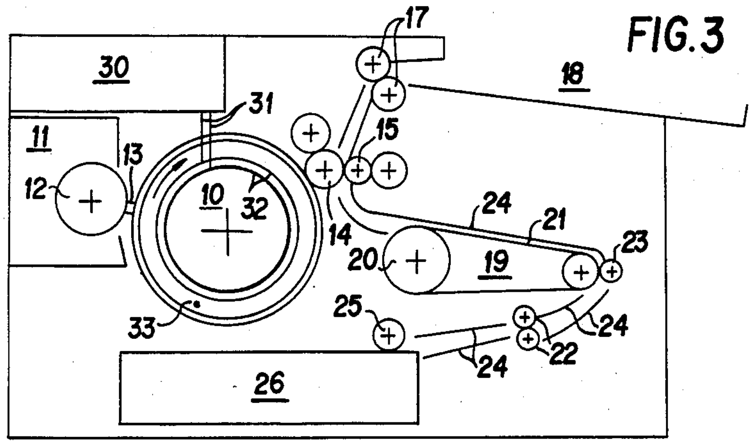
FIG. 3 shows an electrostatic printer equipped with an image-forming element according to the present invention.

FIG. 3 diagrammatically illustates a printer equipped with an image-forming element 10 according to the present invention. In an image-forming station 11, a magnetic roller 12 is disposed a short distance from the surface of image-forming element 10. Magnetic roller 12 comprises a rotatable electrically conductive non-magnetic sleeve and an internal stationary magnet system. The rotatable sleeve of magnetic roller 12 is covered with a uniform layer of electrically conductive and magnetically attractable toner powder which in an image-forming zone 13 is in contact with image-forming element 10. By applying a voltage between magnetic roller 12 and one or more of the selectively controllable electrodes 2 of image-forming element 10, a powder image is formed on image-forming element 10. This powder image is transferred by pressure to a heated rubber-covered transfer roller 14.

From a stock pile 26, a sheet of paper is taken by roller 25 and fed via guideways 24 and rollers 22, 23 to a heating station 19. Heating station 19 comprises a belt 21 trained about a heated roller 20. The sheet of paper is heated by contact with belt 21. The sheet heated in this way is then fed through transfer rollers 14 and 15 where the softened image present on amplifier roller 14 is completely transferred to the sheet of paper. The temperatures of belt 21 and roller 14 are adjusted to one another so that the image fuses on the sheet of paper. The sheet of paper provided with the image is then fed via conveyor roller 17 to a tray 18.

Unit 30 comprises an electronic circuit which converts the optical information of an original into electrical signals which are fed via leads 31 and conductive tracks 32 to blocks 5. Preferably, leads 31 have slide contacts which connect to conductive tracks 32 in the insulating side wall of image-forming element 10. Conductive tracks 32 are connected to blocks 5.

The image formation is fed serially, line by line, to the voltage means, i.e., to the shift registers of the integrated circuits in blocks 5. If the shift registers are completely filled in accordance with the information of one line, that information is put into the output registers and electrodes 2 are selectively actuated via the drivers depending upon the image information signal. While one line is being printed the information of the next line is being fed to the shift registers.

Electrodes 2 extend in the shape of a helix in image-forming zone 13 of image-forming element 10. Since the helix pitch is equal to the working width W of image-forming element 10, only one small zone of each electrode 2 is ever present in image-forming zone 13 at one time. During the printing of a line of information, therefore, each electrode 2 will preferably only print on image-dot of that line. Because of the helical path of electrodes 2, the image dot originating from the same electrode 2 in one line will be pushed up one place in the next line written in succession. The direction in which the image dot is shifted depends on the direction of rotation of the helix and drum 1. For example, the electrode 2 which provides the first image dot during the printing of the first line will successively provide the second, the third, the fourth and so on to the last image dot during the printing of the succeeding lines. The electrode 2 which provides the last image dot of the first line then provides the first, the second and so on to the next to last image dot during the printing of the succeeding lines. After each complete revolution of image-forming element 10, the situation is again the same as when the first image line was written.

Figure 2:
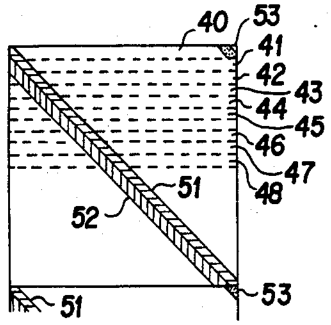
FIG. 2 is a diagrammatic representation showing the way in which images are printed by means of the image-forming element of FIG. 1.

FIG. 2 diagrammatically shows how the image dots of the electrodes 2 which provided the first and last image dots in the first line shift in successive lines. The successively printed lines of information are represented as zones 40–48. Line 51 represents the collection of image dots provided by the electrode 2 which provides the first image dot of the first line and line 52 and point 53 represent the collection of image dots provided by the electrode 2 which provides the last image dot in the first line. After each revolution of image-forming element 10 the situation is again similar to the starting situation. Compare the top and bottom of FIG. 2.

On the start of each printing cycle (i.e. when the first line of information is to be printed) unit 30 must be informed about the position of image-forming element 10 with respect to image-forming zone 13 so that the shift registers can be filled correctly. In the device shown in FIG. 3, each printing cycle is started when image-forming element 10 has reached a fixed starting position. The starting signal for writing the first line is derived by unit 30 from a detection signal originating from a detector (not shown in FIG. 3) which detects a mark 33 provided on image-forming element 10. The electronic circuit of unit 30 also ensures that the shift registers of blocks 5 are correctly filled when the consecutive lines are written.

Apart from optical information originating from an original, electrical signals originating from a computer or a data processing device can also be converted in unit 30 to signals which are fed to the voltage means, i.e., blocks 5.

In the printer shown in FIG. 3, the electrically conductive magnetically attractable toner powder is fed to image-forming zone 13 by magnetic roller 12. It is understood that the tone powder can also be applied in a uniform layer to image-forming element 10 and then selectively be removed therefrom in image-forming zone 13 as described in the above-mentioned U.S. Pat. No. 3,946,402.

While a presently preferred embodiment of the invention had been shown and described with particularity, the invention may be otherwise embodied within the scope of the appended claims.

What is claimed is:

1. An image-forming element for an electrostatic printer comprising: an endless support with a dielectric surface layer thereon; a plurality of image-forming electrodes provided beneath the dielectric surface layer and extending paralell to one another in a zone of the image-forming element used for image formation, each electrode extending in the form of a helix, the pitch of which is at least equal to the width of the image-forming zone; and a voltage means connected to the image-forming electrodes for supplying voltage thereto, the voltage means being disposed on the endless support outside the image-forming zone.

2. An image forming element as described in claim 1 wherein the voltage means is disposed on the surface of the endless support.

3. An image-forming element as described in claim 2 wherein the angle of inclination $\alpha$ of the helix along which the image-forming electrodes extend is between 35° and 55°.

4. An image-forming element as described in claim 3 wherein the angle of inclination $\alpha$ is 45°.

5. An electrostatic printer comprising: a movable image-forming element as described in claim 1; an image-forming station situated along the trajectory of the image-forming element wherein a magnetic roller with an electrically conductive sleeve is disposed near the surface of the image-forming element; and a means for generating an electric field between the image-forming element and the magnetic roller in accordance with an information pattern while electrically conductive magnetically attractable toner powder is fed between the image-forming element and the magnetic roller.

6. An electrostatic printer as described in claim 5 wherein the voltage means of the image-forming element is disposed on the surface of the endless support.

7. An electrostatic printer as described in claim 6 wherein the angle of inclination $\alpha$ of the helix of the electrodes on the image-forming element is between 35° and 55°.

8. An electrostatic printer as described in claim 7 wherein the angle of inclination is 45°.

* * * * *

UNITED STATES PATENT AND TRADEMARK OFFICE
CERTIFICATE OF CORRECTION

PATENT NO. : 4,728,971

DATED : March 1, 1988

INVENTOR(S) : van Stiphout et al.

It is certified that error appears in the above-identified patent and that said Letters Patent is hereby corrected as shown below:

In the Abstract, line 7: please insert "a" after "of".

Column 1, line 20: please delete --tone-- and insert "toner" therefor.

Column 3, line 8: please delete --achivee-- and insert "achieve" therefor.

Column 4, line 48: please delete --amplifier-- and insert "transfer" therefor.

Column 4, line 61: please delete --formation-- and insert "information" therefor.

Column 6, line 20: please delete --paralell-- and insert "parallel" therefor.

Signed and Sealed this

Twenty-third Day of August, 1988

*Attest:*

DONALD J. QUIGG

*Attesting Officer*

*Commissioner of Patents and Trademarks*